United States Patent
Burke

[11] 3,757,601
[45] Sept. 11, 1973

[54] COLLAPSIBLE STEERING COLUMN ASSEMBLY
[75] Inventor: Harold J. Burke, Saginaw, Mich.
[73] Assignee: General Motors Corporation, Detroit, Mich.
[22] Filed: June 22, 1972
[21] Appl. No.: 265,291

[52] U.S. Cl. ................................. 74/492, 188/129
[51] Int. Cl. ............................................. B62d 1/18
[58] Field of Search ............................ 74/492, 493; 188/129, 1 B

[56] References Cited
UNITED STATES PATENTS
3,332,523  7/1967  Chambers .......................... 188/129
3,394,612  7/1968  Bogosoff et al. ...................... 74/492

Primary Examiner—Milton Kaufman
Attorney—Warren E. Finken, Saul Schwartz et al.

[57] ABSTRACT

A telescopeable tube assembly adapted for incorporation in a collapsible steering column assembly, the tube assembly including a first tube section, a second tube section telescopically disposed relative to the first tube section, a plurality of longitudinal track portions on one of the tube sections, a corresponding plurality of seat portions on the other of the tube sections, and a plurality of cylindrical spring pins disposed between the tube sections in the seat portions and in the track portions, the natural resilience of the spring pins generating mechanical friction between a surface of the spring pins and the track portions which friction normally maintains the tube sections in fixed axial relation but which effects energy absorption at a predetermined rate during forced telescopic collapse of the tube assembly.

3 Claims, 5 Drawing Figures

PATENTED SEP 11 1973  3,757,601
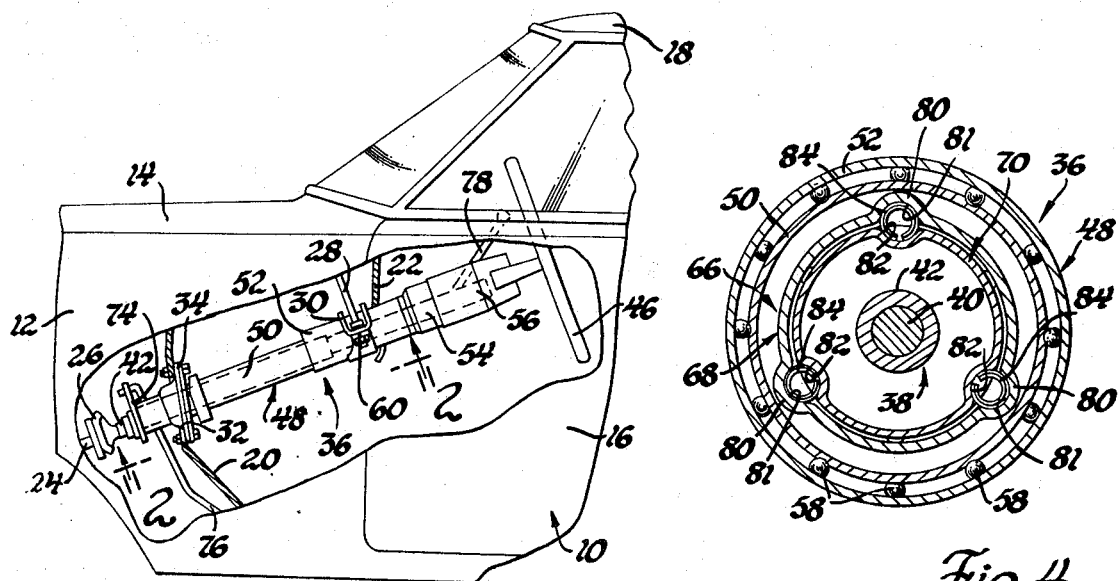
Fig.1
Fig.4
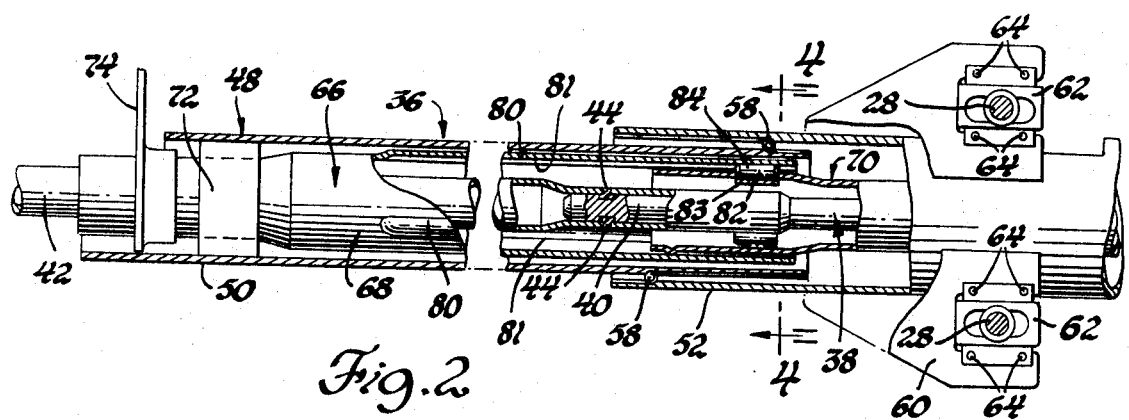
Fig.2
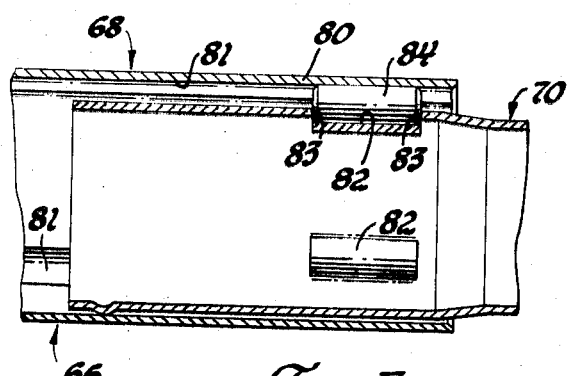
Fig.3
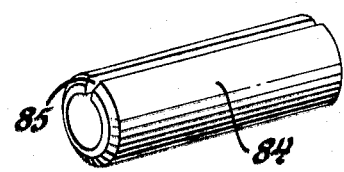
Fig.5

COLLAPSIBLE STEERING COLUMN ASSEMBLY

This invention relates generally to vehicle steering column assemblies of the type adapted to collapse telescopically in an energy abosrbing mode and more particularly to an improved construction for a telescopeable tube portion of the column assembly.

A typical energy absorbing, collapsible steering column assembly for a modern automobile includes a steering shaft for transferring steering torque between a steering wheel and a steering gear and an outer support tube or mast jacket constructed to telescopically collapse in an energy absorbing mode under axial loading. If the vehicle is of the type having a transmission range selector lever on the steering column or a transmission interlock system, the column assembly may further include a shift tube rotatably disposed between the steering shaft and the mast jacket. During collapse of the mast jacket, of course, both the steering shaft and the shift tube must also collapse and to this end a steering column assembly according to this invention incorporates an improved shift tube construction which is simple in design, economical to manufacture, yet dependable in operation and adapted to impart energy absorbing properties to the shift tube for enhancing the overall energy absorbing capability of the column assembly.

The primary feature, therefore, of this invention is that it provides an improved steering column assembly of the energy absorbing, collapsible type. Another feature of this invention is that it provides an improved collapsible energy absorbing steering column assembly including a collapsible shift tube assembly adapted to effect energy absorption by means of mechanical friction. Yet another feature of this invention resides in the provision in the steering column assembly of a collapsible shift tube assembly having an energy absorbing capability which may be tailored to achieve optimum energy absorbing performance of the entire steering column assembly. A still further feature of this invention resides in the provision of a collapsible shift tube assembly including a first tube section, a second tube section telescopically disposed relative to the first tube section, a plurality of longitudinal track portions on one of the tube sections, a corresponding plurality of seat portions on the other of the tube sections, and a plurality of cylindrical spring pins disposed between the tube sections in the seat portions and in the track portions, the resilience of the spring pins generating mechanical friction between a surface of the spring pins and the track portions which friction normally maintains the tube sections in fixed axial relation but which effects energy absorption at a predetermined rate during forced telescopic collapse of the shift tube assembly.

These and other features of this invention will be readily apparent from the following specification and from the drawings wherein:

FIG. 1 is a fragmentary partially broken away side elevational view of an automobile type vehicle having a steering column assembly according to this invention;

FIG. 2 is an enlarged partially broken away view taken generally along the plane indicated by lines 2—2 in FIG. 1;

FIG. 3 is an enlarged view of a portion of FIG. 2 showing the connection between the shift tube sections of the steering column assembly;

FIG. 4 is an enlarged sectional view taken generally along the plane indicated by lines 4—4 in FIG. 2; and FIG. 5 is an enlarged perspective view of one spring pin.

Referring now to FIG. 1 of the drawings, thereshown is the forward portion of an automobile type vehicle body designated generally 10 including a fender assembly 12, a hood and cowl structure 14, a door 16 swingably mounted on the body, and a roof structure 18. The interior of the body between the doors and below the roof structure is bounded at the forward end by a firewall 20 and has disposed thereacross an instrument panel structure, a vertical wall portion of which is indicated at 22. A conventional steering gear, not shown, is supported on the body forwardly of the firewall and includes a worm or input shaft 24 which terminates at a flexible coupling 26. Interiorly of the vehicle body, a pair of rigid laterally spaced struts 28 project generally vertically downward behind the wall portion 22 and rigidly support a collar 30. The firewall 20 includes an aperture 32 in which is disposed a support member 34 rigidly attached to the firewall. The struts 28, the collar 30, and the support member 34 cooperate in supporting on the vehicle body an energy absorbing, collapsible steering column assembly according to this invention and designated generally 36.

As best seen in FIGS. 1, 2 and 4, the column assembly 36 includes a composite steering shaft 38 consistng of an upper shaft section 40 and a lower shaft section 42. The upper shaft section is non-rotatably and telescopeably disposed within the lower shaft section and generally rigidly joined thereto by a plurality of injection molded plastic pins 44, FIG. 2, the two sections being rotatable as a unit. The lower end of shaft section 42 projects through aperture 32 and is connected to the flexible coupling 26 while the upper end of shaft section 40 is connected by conventional means to a manual steering instrumentality or steering wheel 46, the composite steering shaft 38 being operative to transfer steering torque from the steering wheel to the steering gear for controlling the direction of movement of the vehicle.

A support tube or mast jacket assembly 48 is disposed around the steering shaft 38 and includes a lower tube 50 rigidly anchored at the lower end thereof to the support member 34 and an upper tube 52 disposed telescopeably around the lower tube 50. The mast jacket assembly rotatably supports therewithin through conventional bearing means, not shown, the steering shaft 38 and includes at the upper end thereof a hub portion 54 which rotatably supports a shift bowl 56. The upper tube 52 is connected to the lower tube through a plurality of rolling elements 58 which are disposed between the tubes in substantial interference engagement. An instrument panel bracket 60 is rigidly attached to the upper tube 52 and has mounted in appropriate slots therein a pair of capsules 62 retained on the bracket by a plurality of injection molded plastic pins 64. Each capsule 62 has a slot therein through which a corresponding one of the struts 28 projects, each strut threadedly receiving a nut thereon below the capsule 62 for rigidly attaching the instrument panel bracket 60 to the collar 30 and hence to the vehicle body.

As seen best in FIGS. 2, 3 and 4, a shift tube assembly 66 is rotatably disposed within the steering column assembly between the mast jacket 48 and the steering shaft 38 and includes a first or lower tube member 68 and a second or upper tube member 70. The lower portion of the second tube member 70 is telescopably disposed within the upper portion of the first tube member 68. The first tube member 68 is rotatably journaled within the mast jacket by a bearing 72 and has rigidly attached at the lower end thereof a crank arm 74. A transfer link 76, FIG. 1, extends between the crank arm 74 and the transmission of the vehicle, not shown, so that rotation of the tube member 68 alters the operating range of the transmission. The upper end of the second tube member 70 is connected by conventional means to the shift bowl 56 so that rotation of the shift bowl, as by a conventional shift lever 78, effects rotation of the second tube member.

The first tube member 68 has formed thereon a trio of longitudinally extending track portions 80 defining semicircular friction surfaces 81 in cross section. The second tube member 70 has formed therein a trio of seat portions 82, semicircular in cross section and bounded on opposite ends by a pair of abutments 83. The seat portions are angularly spaced for registration with respective ones of the track portions 80 on the first tube member.

Referring now to FIGS. 2 through 5, one of a trio of spring pins 84 is disposed in each of the seat portions 82 between the first and second tube members. The spring pins 84 are cylindrical in configuration and of length generally equal to the distance between the abutments 83 bounding the seat portions 82. Each spring pin has a gap 85, FIG. 5, extending lengthwise thereof and embodies natural resilience which tends to expand the gap or, in other words, expand the outside diameter of the spring pin beyond its smallest value which occurs when the gap 85 is zero. When the spring pins are disposed in the seat portions between the first and second tube members, generally half of each pin, referred to hereinafter as the key portion of the pin, is seated in the seat portion and restrained against axial bodily movement relative to the second tube member by the abutments 83. The other half of each spring pin defines on the outside thereof a friction surface generally complementary to the friction surface 81 of the corresponding track portion. The natural resilience of the spring pins which tends to expand the gaps 85 causes the key portion of each spring pin to firmly seat in the seat portion while generating substantial forces between the friction surface of the pin and the friction surface 81 of the track portion.

The forces between the friction surface of the spring pin and the friction surface 81 of the track portion are directed generally normally to the latter thereby to generate substantial mechanical friction between the spring pins and the track portions. The spring pins, being firmly seated in the seat portions and the track portions, key the first and the second tube members together for unitary rotation so that the shift tube assembly is operative to transfer rotary movement of the shift bowl to the crank arm 74. Further, with the spring pins being axially fixed relative to the second tube member 70, the friction between the pins and the track portions functions to maintain the first tube member in axially fixed relation to the second tube member except when axial forces on the shift tube assembly exceed a predetermined minimum magnitude. Under this latter condition, relative telescopic collapse takes place between the first and the second tube members with the spring pins sliding along the corresponding ones of the track portions.

Describing now the dynamic operation of the steering column assembly 36, a substantial axially directed force imposed on the steering wheel 46 is transferred through the shift bowl and the hub to the mast jacket assembly, the shift tube assembly and the steering shaft assembly. If the magnitude of the force is sufficiently great, the pins 44 between the upper and lower shaft sections of the steering shaft assembly are sheared thus permitting harmless telescopic collapse of the steering shaft assembly. Simultaneously the upper tube 52 of the mast jacket assembly is telescoped over the lower tube 50 with the rolling elements 58 simultaneously effecting metal deformation for absorbing substantial amounts of energy. Further simultaneously, the second tube member 70 of the shift tube assembly telescopically collapses within the first tube member 68, the collapse being accompanied by relative sliding movement between the spring pins 84 and the track portions 80. he normal force between the friction surfaces of the spring pins and the track portions, of course, remains constant during sliding movement so that the frictional drag retarding collapse of the shift tube assembly effects further energy absorption.

The overall energy absorbing capability of the steering column assembly 36, then, is a combination of the energy absorbing capabilities of the mast jacket assembly 48 and the shift tube assembly 66. The energy absorbing capability of the shift tube assembly can be tailored to fit a particular application by manipulating the friction surfaces of the track portions and the friction surfaces of the spring pins. More particularly, for example, if it is desired that only relatively little energy absorption be contributed by the shift tube assembly, the friction surfaces of the track portion and/or the spring pins may be polished or burnished. Further, the axial force required to initiate telescopic collapse of the shift tube assembly can be tailored by treating the friction surface of the track portions only in the general area of contact with the spring pins when the steering column assembly is in its normal, uncollapsed condition.

Having thus described the invention what is claimed is:

1. In a steering column assembly adapted for telescopic collapse in an energy absorbing mode, the combination comprising, a first tube member, a second tube member disposed relative to said first tube member for axial telescopic bodily movement, means on one of said first and said second tube members defining a track portion extending longitudinally of said one tube member, means on the other of said first and said second tube members defining a seat portion, a key member including a frittion surface portion complementary to said track portion and a key portion adapted to engagement on said seat portion, said key member being disposed between said first and said second tube members with said key portion engaging said seat portion for preventing relative bodily movement between said key member and said other tube member and with said friction surface engaging said track portion, said key member including spring means urging relative separation between said seat portion and said friction surface thereby to generate substantial mechanical friction between said friction surface and said track portion for normally maintaining said first and said second tube members in axially fixed relation and for effecting energy absorption at a predetermined rate during relative telescopic movement therebetween.

2. In a steering column assembly adapted for telescopic collapse in an energy absorbing mode and including an axially collapsible steering shaft for transferring steering torque between a steering gear and a manual steering instrumentality, the combination comprising, a first tube member disposed around said steering shaft for rotation and for axial bodily movement relative thereto, a second tube member disposed around said steering shaft for rotation and for axial bodily movement relative thereto and for axial telescopic bodily movement relative to said first tube member, means on one of said first and said second tube members defining a plurality of angularly spaced longitudinally extending track portions, means on the other of said first and said second tube members definining a corresponding number of seat portions adapted for registry with respective ones of said track portions, a plurality of key members corresponding in number to the number of said track portions and each including a friction surface portion complementary to said track portions and a key portion adapted for engagement on respective ones of said seat portions, each of said key members being disposed between said first and said second tube members with respective ones of said key portions engaging corresponding ones of said seat portions for preventing relative bodily movement between said key members and sai other tube member and with respective ones of said friction surfaces engaging corresponding ones of said track portions, each of said key members including spring means urging relative separation between corresponding ones of said seat portions and said friction surfaces thereby to unite said first and said second tube members for unitary rotation while generating substantial mechanical friction between said friction surfaces and said track portions for normally maintaining said first and said second tube members in axially fixed relation and for effecting energy absorption at a predetermined rate during relative telescopic movement therebetween.

3. In a steering column assembly adapted for axial collapse in an energy absorbing mode and including an axially collapsible steering shaft assembly for transferring steering torque between a steering gear and a manual steering instrumentality and an axially collapsible mast jacket assembly surrounding said steering shaft assembly, the combination comprising, a first shift tube member disposed between said steering shaft assembly and said mast jacket assembly for rotation and for axial bodily movement relative to each, a second shift tube member disposed between said steering shaft assembly and said mast jacket assembly for rotation and for axial bodily movement relative to each and for axial telescopic bodily movement relative to said first shift tube member, means on one of said first and said second shift tube members defining a trio of longitudinally extending track portions spaced equally about the circumference of said one tube member and having semicircular configurations in cross section, means on the other of said first and said second shift tube members defining a trio of seat portions spaced equally around the circumference of said other tube member and having semicircular configurations in cross section, and a trio of cylindrical spring pins each having a longitudinally extending gap therein and each defining a friction surface complementary to said track portions and a key portion adapted for engagement on a respective one of said seat portions, each of said spring pins being disposed between said first and said second shift tube members with respective ones of said key portions engaging corresponding ones of said seat portions for preventing relative bodily movement between said spring pins and said other shift tube member and with respective ones of said friction surfaces engaging corresponding ones of said track portions, each of said spring pins having natural resiliency urging relative separation between said seat portions and said friction surfaces thereby to unit said first and said second shift tube members for unitary rotation while generating substantial mechanical friction between said friction surfaces and said track portions for normally maintaining said first and said second shift tube members in axially fixed relation and for effecting energy absorption at a predetermined rate during relative telescopic movement therebetween.

* * * * *